United States Patent [19]

Chaffee et al.

[11] Patent Number: 4,815,926
[45] Date of Patent: Mar. 28, 1989

[54] AIR PALLET AND MATERIALS MOVING SYSTEM

[75] Inventors: Bradley A. Chaffee, Littleton; George Morse, Denver; Roger Payne, Castle Rock, all of Colo.

[73] Assignee: The Gates Rubber Company, Denver, Colo.

[21] Appl. No.: 89,185

[22] Filed: Aug. 25, 1987

[51] Int. Cl.$^4$ .................................. B60V 1/06
[52] U.S. Cl. .................................. 414/676; 180/124; 180/125
[58] Field of Search ............... 414/676; 180/116, 124, 180/125; 198/465.1, 465.2, 803.01

[56] References Cited

U.S. PATENT DOCUMENTS

| | | | |
|---|---|---|---|
| 2,938,590 | 5/1960 | Barnett | 414/676 X |
| 3,237,708 | 3/1966 | Strasser et al. | 414/676 X |
| 3,416,626 | 12/1968 | Nagamatsu | 180/124 |
| 3,576,231 | 4/1971 | Jung | 180/124 |
| 3,648,852 | 3/1972 | Willaweit | 414/676 |
| 3,780,823 | 12/1973 | Michaud et al. | 180/124 X |
| 3,948,344 | 4/1976 | Johnson et al. | 414/676 X |
| 4,155,421 | 5/1979 | Johnson et al. | 414/676 X |
| 4,298,083 | 11/1981 | Johnson et al. | 414/676 X |
| 4,417,638 | 11/1983 | Harvey | 180/125 |
| 4,417,639 | 11/1983 | Wegener | 414/676 X |
| 4,686,719 | 8/1987 | Johnson et al. | 180/125 X |

FOREIGN PATENT DOCUMENTS

| | | | |
|---|---|---|---|
| 712020 | 6/1965 | Canada | 180/116 |
| 782892 | 4/1968 | Canada | 180/125 |

*Primary Examiner*—Leslie J. Paperner
*Attorney, Agent, or Firm*—C. H. Castleman, Jr.; H. W. Oberg, Jr.; J. E. Ebel

[57] ABSTRACT

A ground effects device of the type that introduces pressurized air into a plenum chamber, that then travels through a perforated flexible sheet to form an air cushion, the improvement therein that no air dispersion means are present in the plenum chamber.

8 Claims, 7 Drawing Sheets

AIR PALLET AND MATERIALS MOVING SYSTEM

FIELD OF THE INVENTION

In general, this invention relates to air pallets capable of bearing loads including goods and materials which will be the subject of manufacturing operations, that is, devices that generate a cushion of air upon which the pallet, and the load the pallet bears, are able to be floated from one point to another. More particularly, this invention relates to an improvement in a type of air pallet in which a plenum chamber is bound on one side by a partially flexible load-support member, and on the other side by a relatively thin, flexible perforated sheet.

DESCRIPTION OF THE PRIOR ART

A well-known system in the storage and transportation of various materials is the common wooden pallet, which generally measures approximately 48"×40" and which is transported by conventional forklift equipment, in which a forklift operator moves the fork beneath the pallet, lifts the pallet and then moves the pallet around from location to location. Such wooden pallets have many disadvantages. Firstly, they are subject to breakage, exposing sharp wooden edges and corners, and exposing nails, which can cause damage to both materials and to persons. The pallets themselves are relatively heavy, and constitute a waste of energy since the forklift will have to carry an additional 50 pounds or so, as well as the load itself. Because of their weight and bulk, the pallets are difficult for an individual person to carry from point to point. One of the biggest single disadvantages of using a wooden pallet is the fact that it must be used with a forklift, which is a bulky, cumbersome piece of equipment. Pallets must frequently be moved from flatbed trucks onto loading docks, and vice versa, meaning that at every loading dock a forklift must be present, unless the trucker can carry a forklift on the truck, which itself is an inefficient use of space and fuel.

In an effort to address these problems, pallets have been designed that incorporate an air bearing, film or cushion between the bottom of the pallet and the floor supporting the pallet. This greatly eliminates friction between the pallet and the underlying floor to the point that the pallet, along with its load, can be moved along the floor or other ground surface with relative ease. At first, air cushion pallets were relatively bulky and heavy since the means for supplying pressurized air to the pallet was relatively crude and took up a great deal of valuable space on the pallet itself. Subsequently, a type of air pallet was developed that was relatively light in weight and which took advantage of the creation of a plenum chamber to hold super atmospheric air, which air was allowed to escape through a perforated sheet to form the air cushion underneath the pallet. This technology is described in great detail in U.S. Pat. No. 3,948,344, the disclosure of which is incorporated herein by reference.

It is one object of the present invention to provide an improved version of a relatively small, light-weight air pallet that can be used to transport relatively small loads along relatively confined pathways. It is another object of the present invention to provide for small, compact air pallets that are fully self contained, relying on no external sources of pressurized air or electrical power. It is yet another object of the present invention to provide for a system of moving materials, work-in-process, or workpieces through a manufacturing operation in assembly line fashion, in a manner that does away with conventional conveyor-type assembly line apparatus. It is yet another object of the present invention, in an alternative form, to have an air pallet mounted within a rack or display means so that visually appealing displays of goods can easily be moved from location to location without the necessity of having to rearrange the goods themselves. It is yet another object of the present invention to provide for an air pallet that relies on an external source of pressurized air, yet is so inexpensive to manufacture that it is disposable in nature after one or more uses.

SUMMARY OF THE INVENTION

In one form, the present invention is directed to a portable apparatus for movement of a load upon a friction-reducing cushion of air, comprising: a substantially planar, partially flexible load-support member having upper and lower surfaces and having one air outlet; a thin, flexible perforated sheet fixedly attached to, and substantially underlying the lower surface of, the load-support member so as to define a plenum chamber, there being no air dispersion means provided for the plenum chamber; and means for introducing pressurized air into the plenum chamber through the air outlet such that the air pressure inside the plenum chamber can be maintained at a pressure greater than that outside the plenum chamber to create the friction-reducing cushion of air.

In yet another form, the present invention is directed to an improved portable platform for movement of materials on a friction reducing cushion of air, using a substantially planar load-support member having upper and lower surfaces, and having at least one air outlet bored through the entire thickness of the load-support member; a thin, flexible perforated sheet, unobstructedly underlying the load-support member and fixedly attached by at least a portion of the sheet's periphery to the load support member so as to leave a remaining portion of the sheet available to define, along with the load-support member, a plenum chamber, there being no air dispersion means within said plenum chamber; and means for introducing pressurized air into the plenum chamber through the air outlet such that sufficient air resides in the plenum chamber at a pressure greater than that outside the plenum chamber to force air through the perforations in the sheet and thus create an air cushion between the perforated sheet and an underlying ground surface.

The invention may also comprise a system using a plurality of the pallets described above that have been organized so as to carry materials, work-in-process, or workpieces that are to have manufacturing operations performed on them from work station to work station, where various manufacturing operations are performed upon the materials until manufacturing work has been completed.

There is also described an embodiment in which the air pallet described above is incorporated in an apparatus for the movement of goods that are intended to be displayed, in which one of the above-described air pallets is mounted in a display rack or gondola means, so configured as to display a given kind of goods in a predetermined desired fashion, the entire apparatus then being capable of being transported on an air cushion from point to point.

There is also described an enhancement of the above-described air pallet which serves to increase the useful service life of the perforated flexible skin by incorporating a textile pad that is fixedly mounted onto the lower surface of the load-support member, covering substantially all of the lower surface of the load-bearing support member.

DESCRIPTION OF THE PREFERRED EMBODIMENT

Referring first to FIGS. 3-10 inclusive, there is shown at 20 a load-support surface. The load-support surface is a substantially planar board of polymer or wood or some suitable composite that has at least one hole bored through its entire thickness. The load-support surface is relatively smooth, there being no irregularities, channels, grooves, pits, depressions or the like in its surface. Conversely, there are no protrusions, blocks, elevations or the like.

Figure 4:
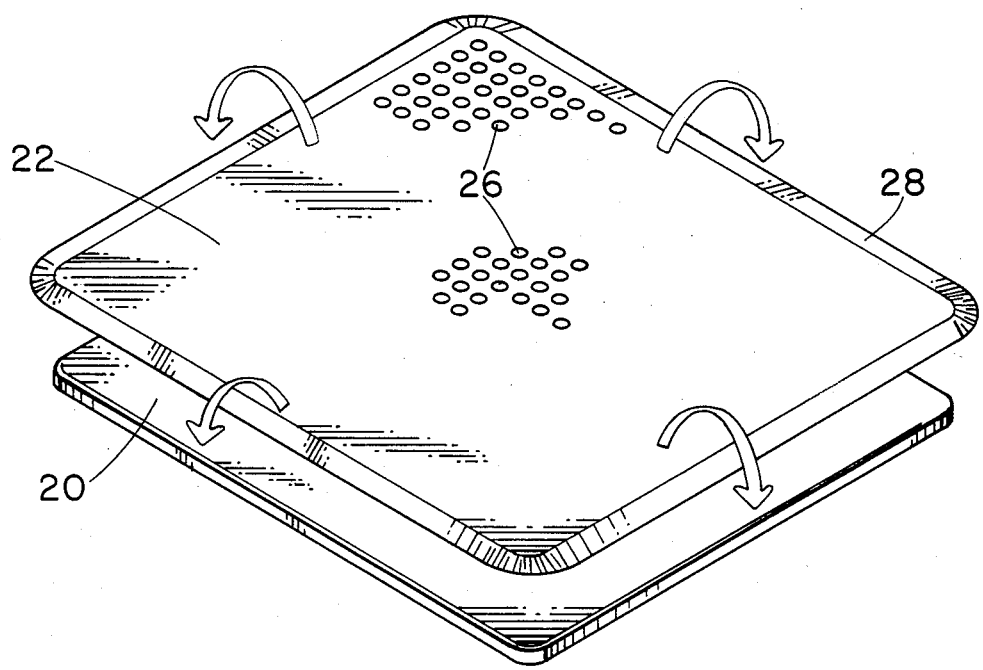
FIG. 4 is an exploded perspective view that illustrates the perforated flexible sheet and the load-support member which, when attached around their respective peripheral edges, will form a plenum chamber.

Lining the lower side of the load-support surface 20 is the perforated plenum containment sheet 22, shown in the perspective view at FIG. 4. The sheet 22 is placed over the load-support surface 20 and attached at its periphery to the load-support surface. More preferably, the sheet 22 is cut slightly larger than the size of the load-support surface 20, creating an in-folded portion of the sheet 28 which can be folded over the outside edge of the load-support surface 20 and adhered thereto, which is shown in greater detail in FIG. 8.

The plenum containment sheet 22 will directly contact virtually all portions of the load-support surface 20 when the device is at rest, i.e. when there is no pressurized air being forced between the lower surface of load-support member 20 and sheet 22. This is an important consideration here, since the prior art teaches that it is absolutely necessary to have some kind of permanent physical separation between such a perforated plenum containment sheet and a load support surface so that a space is always maintained therebetween, even when no pressurized air is being forced through air outlets 24. See, especially, U.S. Pat. No. 3,948,344, which discusses the theory and practice of the use of "air dispersion means" the disclosure of which is incorporated herein by reference. It was previously throught in this art that such a permanent physical means of separation, conventionally referred to as an "air dispersion means," was necessary to give pressurized air an initial pathway within the plenum chamber from which a plenum chamber can readily form. It was throught that if the perforated plenum containment sheet were allowed to sealingly contact the load support surface while the device was heavily loaded and not being pressurized, air would have to be under an inordinate degree of pressure in order to force its way in between the sheet and the support surface to create a plenum chamber of superatmospheric air. We have found that such air dispersion means are not necessary for all embodiments of this class of ground effect device. In the embodiment which constitutes the present invention, no air dispersion means is needed and there is no problem posed by allowing the perforated plenum containment sheet 22 to enter into sealing contact with the load-support surface 20. We have discovered that if the load-support surface described in the prior art is configured of such a material and/or dimension as to render it more flexible then the load-support surfaces described in the prior art, then no air dispersion means is needed. If a source of pressurized air is turned on or released to flow through an outlet hole in an effectively rigid load-support member, in an attempt to separate a plenum containment sheet therefrom, the observation is correct that if the sheet and the load-support surface are in sealing contact, then air will not be able to propagate, to separate these two members so as to create the plenum chamber. However, if the load-support surface is sufficiently flexible, noting that flexibility of the load-support surface is a function of its length, there will be a very brief interval during which air pressure will build up in the vicinity of an outlet hole in the load-support surface, causing the load-support surface to bow upwards, creating a pocket between the lower surface of the load-support surface and the plenum containment sheet, which is a point from which a plenum chamber can propagate until it is fully inflated.

Figure 3:
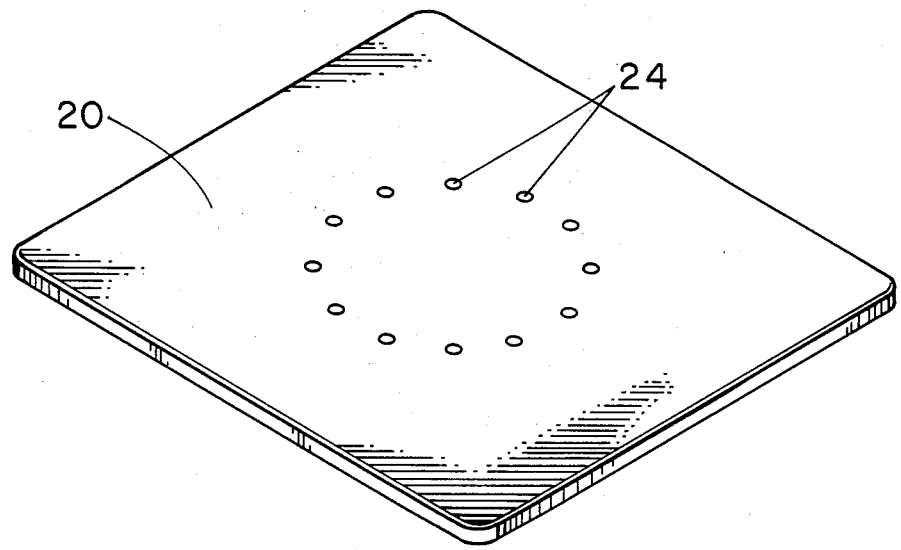
FIG. 3 is a perspective view of the load-support member of the improved air pallet, illustrating a ring-like pattern of bored holes which represents multiple air outlets for pressurized air to enter into a plenum chamber.
Figure 5:
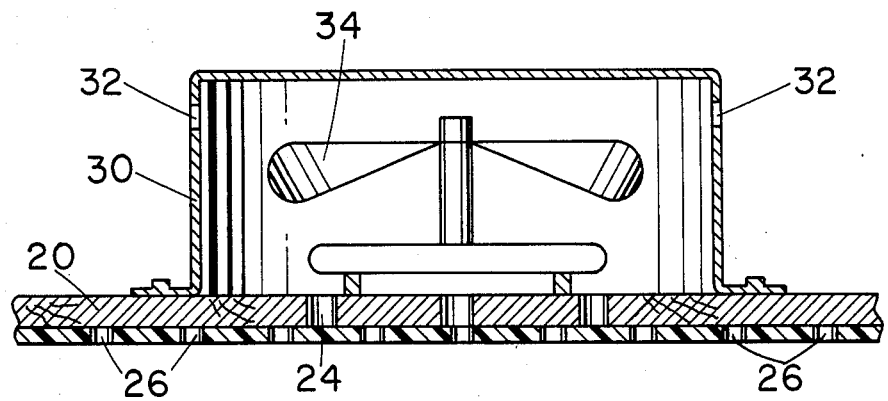
FIG. 5 is a partial cutaway side view of a portion of the fully self-contained version of the improved air pallet, showing the perforated flexible sheet, the load-support member and a motorized fan within its housing or receptacle that will act as a source of pressurized air for this particular embodiment.
Figure 6:
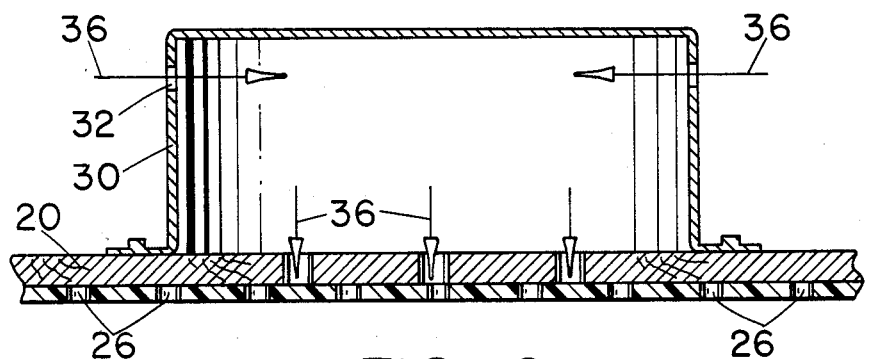
FIG. 6 is likewise a partial cutaway view, similar to FIG. 5, except that the pressurized air means is not illustrated, so that the directions of air flow can be shown through intakes in a housing or receptacle and out the outlet holes of the load-support member.
Figure 7:
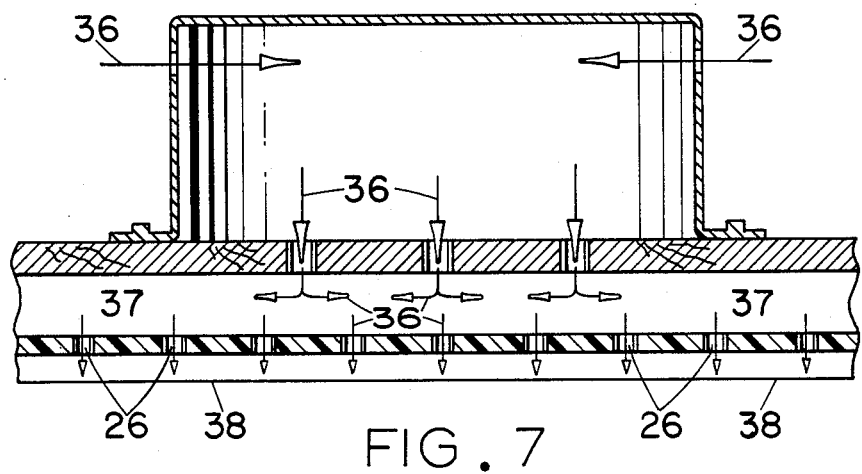
FIG. 7 is a likewise a partial cutaway side view illustrating the same device as in FIG. 6, except that the flow of pressurized air is now sufficient to form a plenum chamber between the perforated sheet and the load support member, resulting in a flow of air from the plenum chamber through the individual holes of the perforated sheet to form an air cushion between the device and the ground.

At FIG. 3 there is shown in the load-support surface 20 a ring-like series of multiple outlet holes 24. When an internal air source of the type depicted in FIG. 5 is used, the pattern of holes depicted in FIG. 3 is particularly effective at causing the load-support surface 20 to bow upwards and initiate formation of a plenum chamber. The air source means 34 of FIG. 5, shown there within a housing or receptacle 30, will cause air to flow in the directions indicated in FIGS. 6 and 7 at 36. Air source means 34 can be mounted on the load-support surface 20, or any of the inner wall surfaces of the receptacle 30. The air source means can be a fully self-contained system having a fan means, a motor means to drive the fan means, and suitable electrochemical storage battery means to power the motor means. Air will enter one or more inlet holes 32, and be forced downwards through one or more outlet holes 24. After the plenum chamber 37 has been formed by separation of the perforated plenum containment sheet 22 from the load-support surface 20, air will continue to be forced into the plenum chamber 37 from the air outlet hole(s) 24. When pressure in the plenum chamber 37 becomes sufficiently superatmospheric, air will be forced from the plenum chamber downwards through the perforations 26 in the plenum containment sheet 22 and will cause formation of a cushion of air that will form a virtually friction-free fluid body between the bottom of the containment sheet 22 and the environmental surface 38 over which the device is hovering. As the device begins to hover, the load will be somewhat raised or jacked upwards, this height being determined by the thickness of the cushion of air on which the device is hovering and the thickness of the plenum chamber 37.

It will be noted by looking at FIGS. 5–8 that the load-support surface 20 is variously depicted as being constructed of either wood or polymer. Selection of materials or thickness of the load-support surface 20 depends upon desired flexibility of the load-support surface. The examples given below will show more fully some of the various combinations of choice of material and thickness of material that are successful in building embodiments of the invention that do not use air dispersion means.

Figure 1:
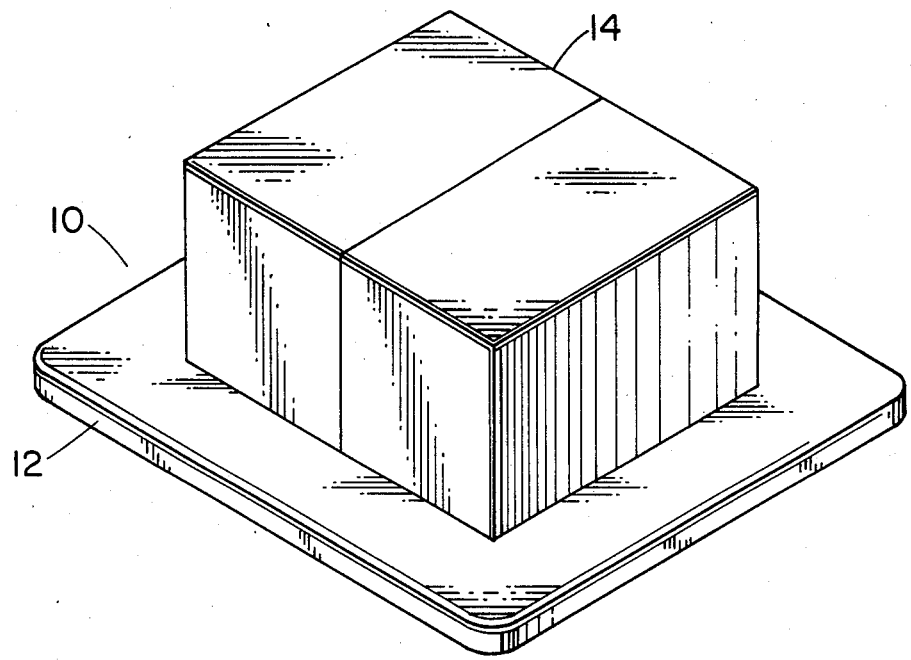
FIG. 1 is a perspective view of the fully self-contained version of the improved air pallet with a representative load thereon.
Figure 8:
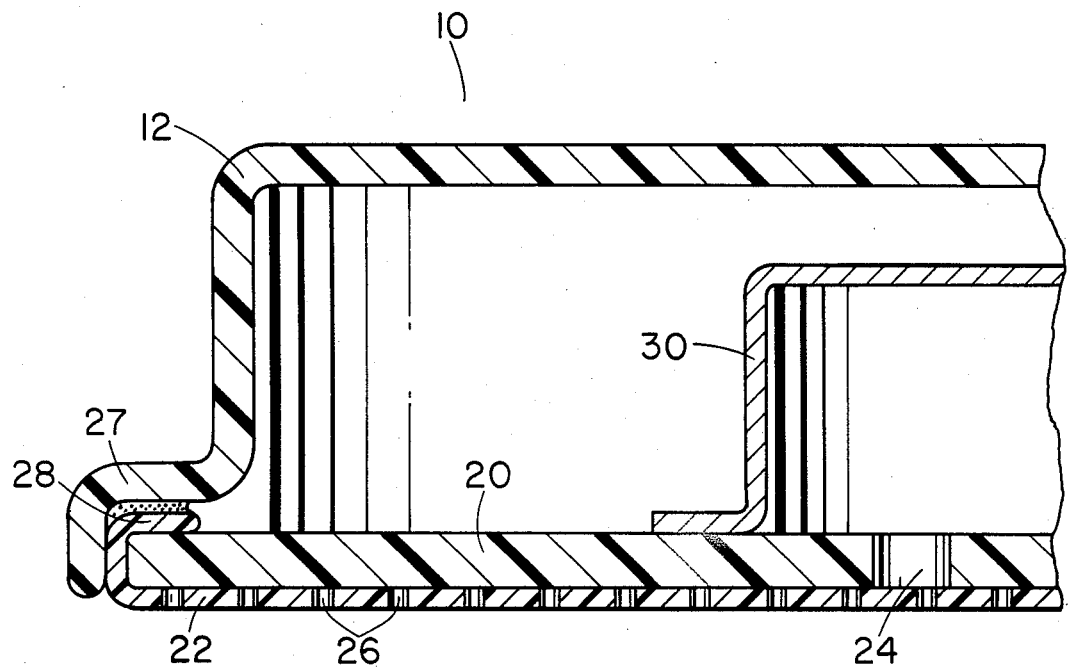
FIG. 8 is an enlarged partial cutaway view of the self-contained version of the improved air pallet illustrating details of how the flexible perforated sheet is sealed at its periphery with the load-support member and how the pallet housing fits over the entire assembly.

Turning now to FIG. 8, there is shown a cutaway portion of the self-contained version of the improved air pallet. 12 illustrates a portion of the self-contained pallet housing. The housing 12 will generally be polymeric, and can be configured so as to have a circumferential flange 27 that may act as a sealing lip over the in-folded portion 28 of the perforated plenum containment sheet 22. The housing 12 can be fixedly attached if necessary to load-support surface 20 by means of bolts, screws or the like (such attachment means not illustrated) in order to further effectuate the seal needed between the containment sheet 22 and the load-support surface 20. The housing 12 will house an area in which a source of pressurized air will reside. This could be a pressurized tank of air or, more commonly and more preferably, a fan means driven by a motor means which most preferably will be powered by an electrochemical storage battery means or the like. A load 14 will be mounted on the uppermost surface of the housing 12, as shown in FIG. 1.

Figure 11:
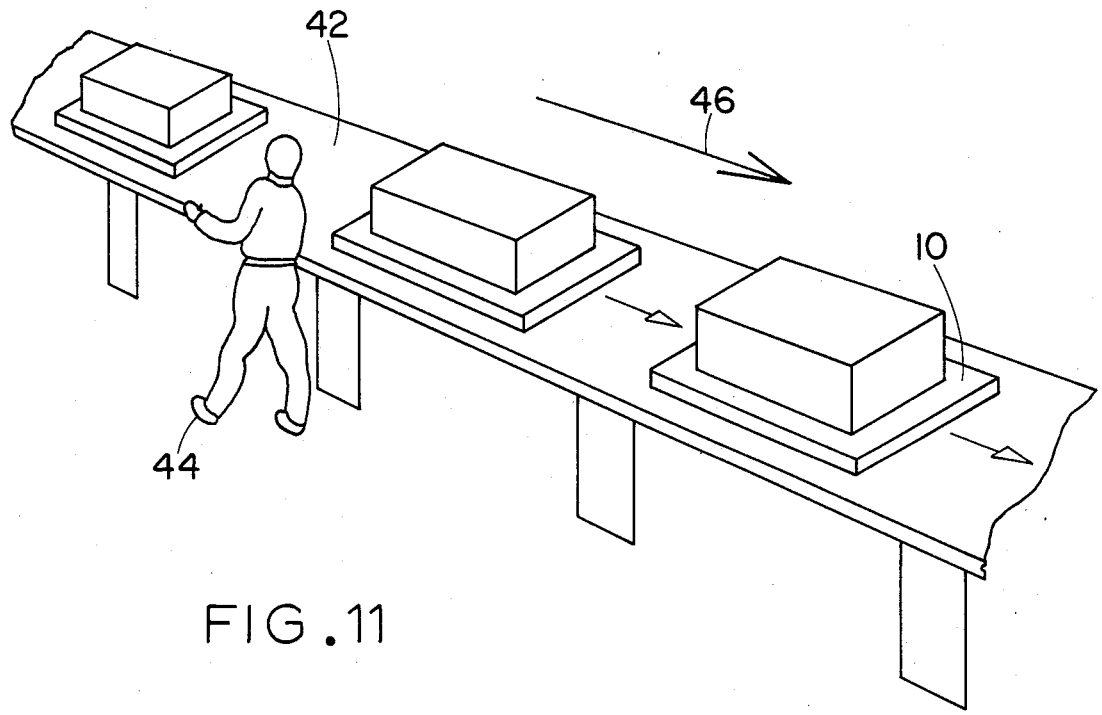
FIG. 11 is a perspective illustration of a system for using a plurality of improved air pallets in a manufacturing assembly line environment.

An especially good application of an air pallet having this type of construction, and being fully self contained, is that illustrated in FIG. 11. There, a suitable number of such pallets 10 will have various materials placed on them, which will be the subject of manufacturing operations to be performed on them. Once loaded, each pallet 10 will be turned on and will ride on its cushion of air to the workstation where a manufacturing operation will be performed on the materials. The platform will subsequently likewise be moved through a sufficient number of workstations to complete whatever manufacturing work must be done on the materials being moved by the system. It can be seen that in the most preferred embodiment of this manufacturing system, each individual pallet 10 will carry its own load of materials on a substantially planar causeway 42 that is elevated above ground level to a height sufficient to allow necessary manufacturing operations to be performed on the materials being moved by an operator 44 before sending the materials on their way 46 to the next manufacturing station. Such a manufacturing system will work especially well in assembly line environments in which the final manufactured product is relatively small, such as in the manufacture of electronic components and finished products.

Figure 9:
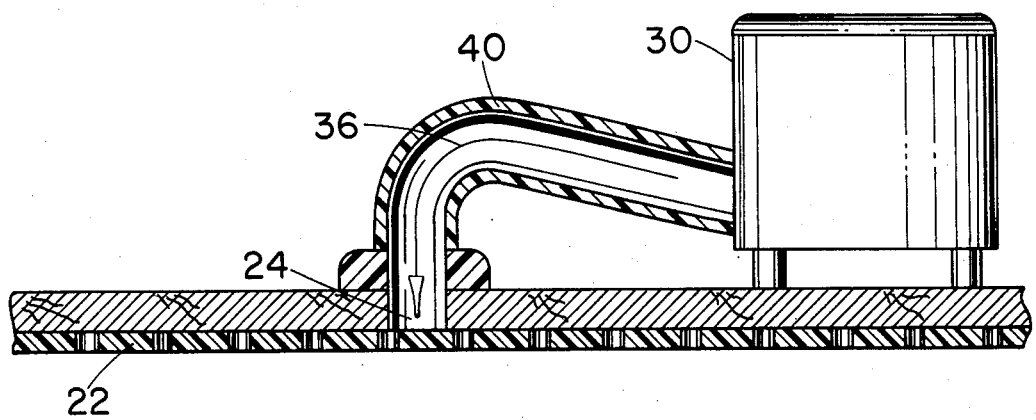
FIG. 9 is a partial cutaway side view illustrating an alternative embodiment of the self-contained version of the improved air pallet in which the source of pressurized air is connected indirectly to the air outlet in the load-support member rather than directly, as in the previous embodiment illustrated.
Figure 10:
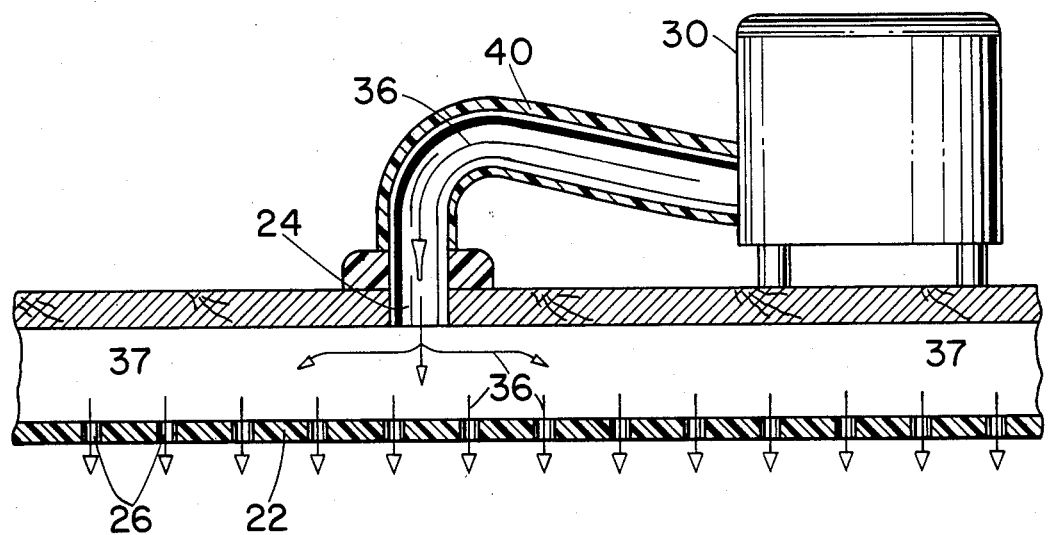
FIG. 10 is likewise a partial cutaway side view of the same device as illustrated in FIG. 9 but now showing the air flow through the device when sufficient air is present to create the plenum chamber, with the resultant flow of air through the perforated sheet to create the air cushion.

Turning now to FIGS. 9 and 10, it can be seen that where a motorized fan means is used to provide pressurized air to an air pallet, such fan need not necessarily be mounted directly over the outlet holes 24, as depicted in FIG. 5. Rather, as in FIGS. 9 and 10, the air source means 30 may be connected by an air source conduit or hose 40 to direct air along direction 36 to such outlet 24. In all other respects, this embodiment of the self-contained version of the air pallet will operate in the manner previously described.

Figure 2:
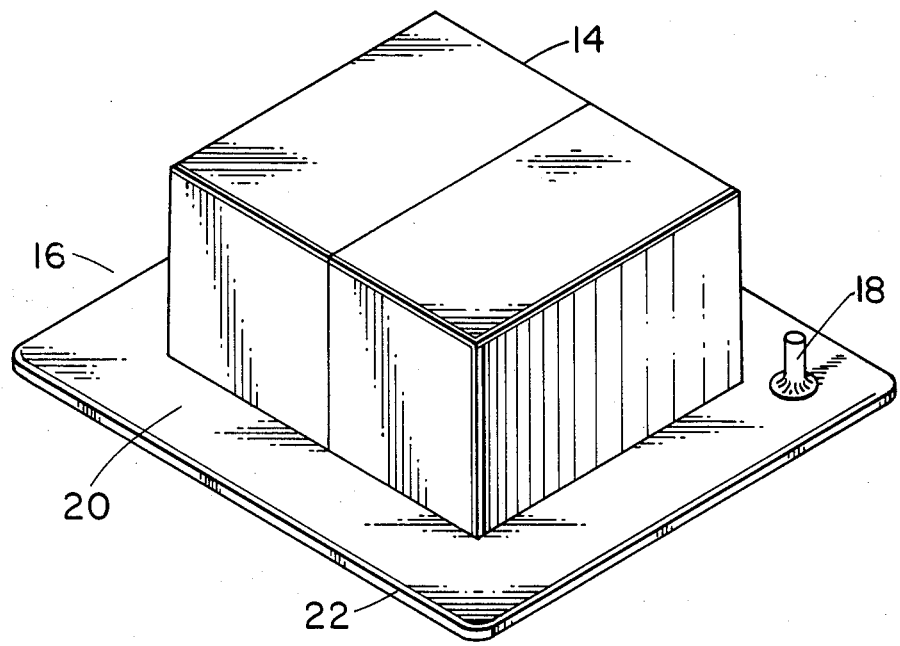
FIG. 2 is a perspective view of a version of the improved air pallet using an external air source, again with a representative load thereon.

Certain applications of the air pallet will require use of an air pallet that is very inexpensive to make so that it can be used a relatively limited number of times and then be discarded. Such an embodiment is shown at FIG. 2. The embodiment shown at FIG. 2 is not fully self contained, rather relying on an external air source (not shown) to deliver pressurized air to external air by way of an air conduit (not shown), for example, source nozzle 18, which, of course, constitutes an alternative means for introducing pressurized air into the plenum chamber. Air will flow through the nozzle, through one or more air outlet holes (as shown in FIG. 3), thence separating the plenum containment sheet 22 from the load-support surface 20 to form a plenum chamber 37, as described above. The principle of load-support surface flexibility (which is the means by which a plenum chamber is propagated and subsequently defined, as discussed above) applies with equal force to this embodiment. For this particular embodiment, we have discovered that even certain grades of cardboard are suitable to operate as the load-support surface.

Figure 12:
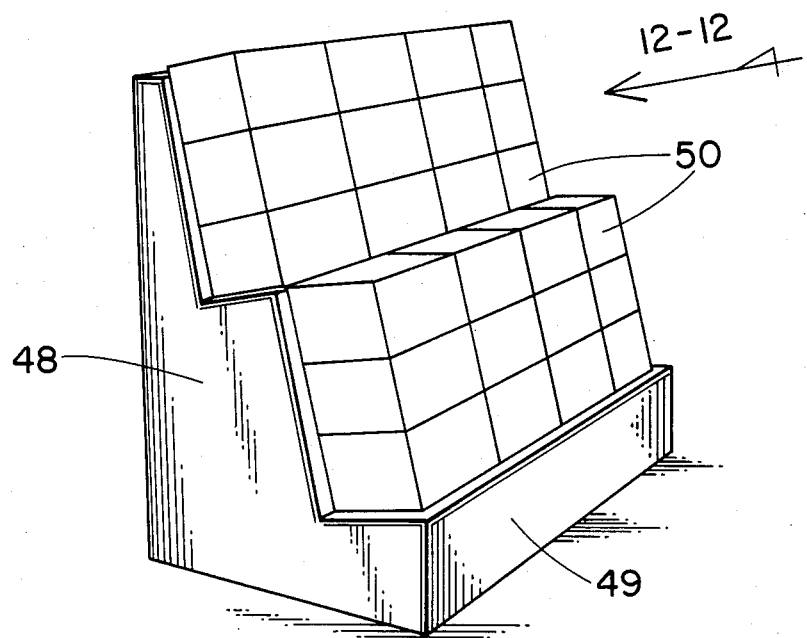
FIG. 12 is a view in perspective of a display means with goods displayed thereon.
Figure 13:
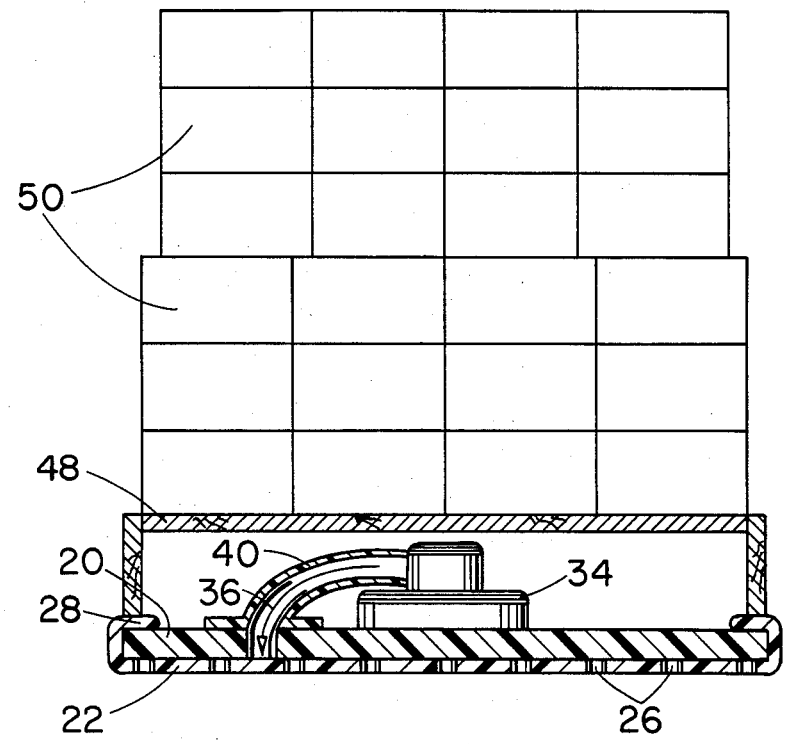
FIG. 13 is a frontal and partial cutaway view taken along line 12—12 of FIG. 12, illustrating the improved air pallet of the present invention mounted beneath the display, constituting the means by which the display can be moved.

Turning now to FIG. 12, Applicants' there illustrate another alternative embodiment and application of the invention. 48 is a display rack (or "gondola," as that term is sometimes used in marketing) of the type commonly seen in retail establishments and meant to display goods or merchandise 50 in a predetermined desired fashion to catch the eye of consumers and potential purchases of such goods or merchandise. In the past, merchants and others using such racks have been faced with the task of removing the goods from the rack whenever it was desired to move the rack to a different location. Naturally, such racks or gondolas could be put on wheels, but if the load thereon were still particularly great, the rack would still be hard to move, and the action of the wheels on the ground surface frequently might be severe enough to cause goods remaining on the display to topple off. In an attempt to address this problem, the alternative embodiment of the invention shown in FIG. 12 illustrates the rack 48 riding on an air pallet that provides a cushion of air to move the rack around when the owner of it so desires. The display rack 48 must be substantially seated upon or sufficiently secured to the load-support surface 20 so that the rack or goods thereon do not fall. The display rack can be seated in any manner that allows the rack and goods to remain upright, as shown, while being transported upon a friction-reducing cushion of air. Turning to FIG. 13, which is taken along view 12—12 of FIG. 12, there is shown a partial cutaway view depicting the presence of the air pallet of the present invention behind the apron 49 of the display rack 48. The air pallet used in the rack or gondola can be seen to have features similar to those of the other alternative embodiments of the air pallet, that is, an air source 34, which causes air to flow along direction 36 into a plenum chamber (not shown) that can be created between load-support surface 20 and perforated plenum containment sheet 22. When the owner or operator desires to move the rack or gondola, an internal power source (or an external power source such as an electrochemical storage battery plugged into the rack unit) is switched on, a cushion of air is developed causing the rack to hover, and it can be conveniently pushed to any location desired by the operator. This can be particularly advantageous in fully integrated manufacturing and merchandising systems. For example, merchandise can be gathered at a warehousing center, appropriately arranged on the display or gondola, wrapped in a suitable way, such as by using clear plastic shrink wrap, then floated from the warehousing facility onto a truck, and subsequently floated off the truck at a waiting retail unit, where the shrink wrap is stripped away and the entire display is immediately ready for presentation to the public.

It should be noted that although we have discovered that the air dispersion means of the prior art is not necessary in many embodiments of this class of ground effect vehicle, such air dispersion means is still desirable in certain applications where the load to be managed is extemely heavy and requires load-support surfaces of such high modulus, or of such a thickness, that they are effectively inflexible or rigid under the circumstances. Where this is the case, air dispersion means may still advantageously be used with the display system or the manufacturing assembly line transport system described above.

Figure 14:
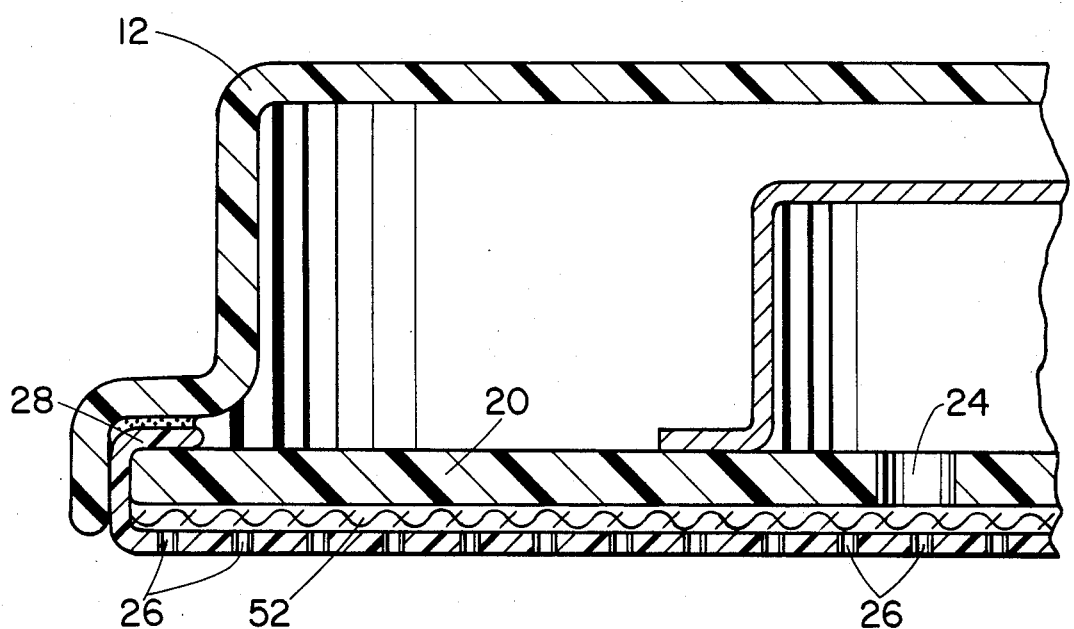
FIG. 14 is a cutaway side view illustrating the relative placement of a textile pad in between the load support member and the flexible perforated sheet.

The perforated plenum containment sheet can be any flexible thin film. Naturally, some materials will be much more wear resistant than others given the abrasive actions to which this sheet will be subjected as the air pallets start up and slow down. We have found that a particularly good material for this sheet is vinyl impregnated cheesecloth. The lifetime of the sheet can be further enhanced by including a cushion as shown in FIG. 14. There, a textile cushion 52 has been fixedly adhered to the lower surface of load-support 20. A particularly good material for this application is the nonwoven felts that have been needle punched and/or thermoformed in accordance with the method described in U.S. Pat. No. 4,424,250, the disclosure of which is incorporated herein by reference, although this is not means to exclude other cushioning materials, such as polyurethane foam. Adhering such a cushion to the lower surface of the load-support surface 20 will still result in the load-support surface having an essentially planar surface free of either depressions of protrusions (and therefore being free of any air dispersion means), as discussed above. Whenever any embodiment of the invention utilizing one of these cushion layers is floated to a desired spot and turned off, the cushioning effect of the cushion layer serves to greatly enhance the lifetime of the perforated flexible plenum containment sheet.

EXAMPLE 1

A load-support surface was prepared having an approximate area of 20"×20". A 16 v battery system powered a motor-driven fan to achieve a maximum pressure of 0.22 psi, which was sufficient to lift up to 75 pounds of load. The load-support surface was made of one-quarter inch thick ABS plastic.

EXAMPLE 2

This example illustrates a device which may need air dispersion means, or permanent plenum separation, to operate properly due to its effectively rigid load-support surface. A load-support surface of 30"×18" was prepared from ¾" plywood. A 16 v battery system powered a motor-driven fan to achieve a maximum pressure of 0.23 psi, which was sufficient to lift up to 75 pounds of load.

EXAMPLE 3

A load-support surface of 30"×18" was prepared from ⅛" plywood. A 16 v battery system powered a motor-driven fan to achieve a maximum pressure of 0.23 psi, which was sufficient to lift up to 100 pounds of load.

It is thought that the improved air pallet and method of the present invention and its intended advantages will be understood from the foregoing description, and it will be apparent to those skilled in the art that various changes may be made in the form, construction and arrangements of the parts thereof without departing from the spirit or scope of the invention or sacrificing all of its material advantages. It should be understood that various alternative embodiments are feasible. The forms herein described are merely preferred embodiments, and descriptions herein should not be construed or interpreted as the only embodiments. Although these descriptions have largely discussed application of this invention to construction of air pallets for moving relatively small loads, for moving materials in manufacturing assembly line operations, and for moving merchandise displays, these are only some of the major applications of the technology, and other applications of the invention, such as transporting other products are not intended to be precluded. Furthermore, the foregoing specification is also intended to form the necessary disclosure for methods of making and using the invention and its various alternative embodiments. The following claims should therefore be interpreted as broadly as is reasonable.

What is claimed is:

1. A portable apparatus for movement of a load upon a friction-reducing cushion of air, comprising:
   a substantially planar, partially flexible load-support member having upper and lower surfaces and having one air outlet;
   a thin, flexible perforated sheet fixedly attached to, and substantially underlying the lower surface of, the load-support member so as to define a plenum chamber, there being no air dispersion means provided for the plenum chamber; and
   means for introducing pressurized air into the plenum chamber through the air outlet such that the air pressure inside the plenum chamber can be maintained at a pressure greater than that outside the plenum chamber to create the friction-reducing cushion of air.

2. The apparatus as claimed in claim 1, wherein the means for introducing pressurized air further comprises:
   a source of pressurized air;
   a nozzle fixedly mounted on the upper surface of the load-support member; and
   means for connecting the nozzle to the source of pressurized air so that the source of pressurized air is in communication with the nozzle and the plenum chamber.

3. The apparatus as claimed in claim 1, wherein the means for introducing pressurized air further comprises:
   a receptacle adapted for receiving pressurized air, the receptacle being in communication with the plenum chamber;
   a source of pressurized air located outside of the confines of the receptacle; and
   means for connecting the source of pressurized air to the receptacle.

4. The apparatus as claimed in claim 1, wherein the means for introducing pressurized air further comprises:
   a receptacle having a plurality of inner wall surfaces, the receptacle adapted for receiving pressurized air and to be in communcation with the plenum chamber;
   a source of pressurized air fixedly mounted on at least one of the inner wall surfaces of the receptacle so that pressurized air is forced directly through the air outlet and into the plenum chamber.

5. A portable apparatus for movement of a load upon a friction-reducing cushion of air, comprising:
   a substantially planar, partially flexible load-support member having a plurality of air outlets and having upper and lower surfaces;
   a thin, flexible perforated sheet fixedly attached to, and substantially underlying the lower surface of, the load-support member, so that the sheet and the lower surface of the load-support member define a plenum chamber, there being no air dispersion means within the plenum chamber;
   a receptacle attached to the upper surface of the load-support member having a plurality of inner wall surfaces, the receptacle adapted for receiving pressurized air and to be in communication with the plenum chamber;
   a source of pressurized air fixedly mounted on at least one of the inner wall surfaces of the receptacle so that pressurized air is forced directly through the plurality of air outlets and into the plenum chamber; and
   a pallet housing substantially overlaying the load-support member, the pallet housing and the upper surface of the load-support member defining a space for containment of the receptacle.

6. An assembly line system for the movement of workpieces subject to manufacturing operations, comprising:
   a portable apparatus for movement of at least one of the workpieces upon a friction-reducing cushion of air, comprising a substantially planar, partially flexible load-support member having a plurality of air outlets and having upper and lower surfaces; a thin, flexible perforated sheet fixedly attached to and substantially underlying the lower surface of the load-support member so as to define a plenum chamber; a receptacle attached to the upper surface of the load-support member having a plurality of inner wall surfaces, the receptacle adapted for receiving pressurized air and to be in communication with the plenum chamber; a source of pressurized air in communication with the receptacle; and
   a substantially planar causeway defining the pathway along which the portable apparatus is movable.

7. A portable apparatus for movement of a display of goods upon a friction-reducing cushion of air, comprising:
   a substantially planar, partially flexible load-support member having upper and lower surfaces and having one air outlet;
   a thin, flexible perforated sheet fixedly attached to and substantially underlying the lower surface of the load-support member so as to define a plenum chamber, there being no air dispersion means provided for the plenum chamber;
   means for introducing pressurized air into the plenum chamber through the air outlet such that the air pressure inside the plenum chamber can be maintained at a pressure greater than that outside the plenum chamber to create the friction-reducing cushion of air; and
   a display means for the goods, the display means being substantially seated upon the load-support member.

8. A portable apparatus for movement of a load upon a friction-reducing cushion of air, comprising:
   a substantially planar load-support member having a periphery and upper and lower surfaces and having at least one air outlet bored through the load-support member;
   a thin, flexible perforated sheet unobstructedly underlying the load-support member folded over the periphery of the load-support member and fixedly attached to the upper surface of the load-support member, so that the sheet and the lower surface of the load-support member define a plenum chamber, there being no air dispersion means within the plenum chamber;
   means for introducing pressurized air into the plenum chamber through the air outlet such that sufficient air can reside in the plenum chamber at a pressure greater than that outside the plenum chamber, to force air through the perforations in the sheet and thus create the friction-reducing cushion of air; and
   a pallet housing having a circumferential flange contacting the portion of the perforated sheet that is folded over onto the upper surface of the load-support member.

* * * * *